US005744565A

United States Patent [19]
Denkinger et al.

[11] Patent Number: 5,744,565
[45] Date of Patent: Apr. 28, 1998

[54] PLASTISOLS

[75] Inventors: Peter Denkinger, Kendall Park, N.J.; Wilhelm Elser, Griesheim, Germany

[73] Assignee: Roehm GmbH Chemische Fabrik, Darmstadt, Germany

[21] Appl. No.: 746,813

[22] Filed: Nov. 18, 1996

[30] Foreign Application Priority Data

Nov. 16, 1995 [DE] Germany .......... 195 42 746.7

[51] Int. Cl.$^6$ .................................. C08F 20/10
[52] U.S. Cl. .......... 526/318.4; 428/407; 524/560
[58] Field of Search ............ 526/318.4; 428/407; 524/560

[56] References Cited

U.S. PATENT DOCUMENTS

| | | | |
|---|---|---|---|
| 4,184,992 | 1/1980 | Hosaka | 526/329.7 |
| 4,771,117 | 9/1988 | Citron et al. | 526/329.7 |
| 4,877,853 | 10/1989 | Siol et al. | 526/329.7 |
| 4,942,001 | 7/1990 | Murphy et al. | 526/329.7 |
| 5,300,601 | 4/1994 | Besecke et al. | 526/329.7 |
| 5,374,698 | 12/1994 | Young et al. | 526/318.4 |
| 5,464,916 | 11/1995 | Young et al. | 526/318.4 |
| 5,540,989 | 7/1996 | Maul et al. | 526/329.7 |

FOREIGN PATENT DOCUMENTS

| | | |
|---|---|---|
| 2005123 | 8/1971 | Germany . |
| 2812016 | 9/1978 | Germany . |

*Primary Examiner*—Joseph L. Schofer
*Assistant Examiner*—N. Sarofim
*Attorney, Agent, or Firm*—Oblon, Spivak, McClelland, Maier & Neustadt, P.C.

[57] ABSTRACT

A bead polymerizate P which is prepared by suspension polymerization of monomer and then mechanically comminuted.

3 Claims, No Drawings

PLASTISOLS

BACKGROUND OF THE INVENTION

FIELD OF THE INVENTION

The invention relates to plastisols based on polymer masses plasticized with a plasticizer, which masses are used in the form of mechanically comminuted polymer beads.

DESCRIPTION OF THE BACKGROUND

Plastisols, which are two-phase systems consisting of plastic or resin particles and a suitable plasticizer, can theoretically be produced from the most varied plastics, but technical application of plastisols has been limited to a few polymer systems until now. The most important plastisols up to the present time are produced with PVC (cf. Ullmann's Encyclopedia of Industrial Chemistry, 5th Ed., Vol. A21, p. 734–737, VCH 1992; Becker-Braun, Kunststoff-Handbuch [Plastics Handbook], 2nd edition, Vol. 2/2, p. 1077–1090, C. Hanser 1986; H. F. Mark et al., Ed., Encyclopedia of Polymer Science & Engineering, 2nd ed., Ed. Supplem. Vol. p. 568–643, Wiley-Interscience 1989). But plastisols based on acrylates, so-called PAMA plastisols, have been available for practical applications for some time (cf. DE-PS 934 498, FR-A 2.291.248). The latter plastisols are based on the recognition that coordination of the glass transition temperature Tg, the particle size and the composition of the polymer particles, on the one hand, and special plasticizers, on the other hand, is required for the production of technically acceptable PAMA plastisols. In this connection, the rule is established that the average particle size of the polymerizate must be all the larger, the lower its glass transition temperature Tg. The average grain size of the polymer must range from 0.1 μm to 500 μm, according to the FR-A, and should preferably range from 0.3 to 200 μm. Both suspension-polymerized and emulsion-polymerized acryl polymers are indicated as being suitable primary particles.

DE-A 25 43 542 also describes PAMA plastisols, preferably with basic comonomers, in a particle size range from 0.1 to 200 μm, which are preferably obtained as emulsion polymerizates. Particles from 0.1 to 20 μm, especially to 10 μm, are particularly preferred. However, particles of this latter size range can only be produced by emulsion polymerization, according to this reference. Another modification of PAMA plastisols is proposed in DE-A 27 72 752 and 29 49 954. These publications describe core/shell polymerizates with a plasticizer-compatible core and a shell with lesser plasticizer compatibility. U.S. Pat. No. 4,558,084 describes a plastisol based on a copolymerizate of methyl methacrylate and itaconic acid, i.e. itaconic acid anhydride, which is said to exhibit particularly good adhesion to metal surfaces pre-treated by electrophoresis. Recently, floor coverings based on PAMA plastisols have been proposed, in which a pure polymethyl methacrylate (PMMA) is used as the matrix material; it is used partially in the form of an emulsion polymerizate, partially in the form of a suspension polymerizate (DE-A 39 03 669). As described in EP-A 0 477 708, it is possible to obtain a plastisol which exhibits improved product quality and a greater spectrum of use simultaneously using spray-dried polymer dispersions and bead polymerizates obtained by suspension polymerization, at least one of which is a methyl methacrylate copolymerizate.

Additional work in the field of PAMA plastisols has served to improve the adhesive strength of the plastisols, particularly on metallic substrates, for example by using 2.5–10% by weight polyamide resins (polyamino amides) (cf. EP-A 0 533 026). EP-A 0 121 759 also recommends polyamide resins as protective colloids in order to improve the storage stability of plastisols. Other references aim at improving the adhesive properties, for example, by using glycidyl (meth) acrylate, among other substances, in the PAMA polymer (U.S. Pat. No. 5,120,795), or at improving plasticizer compatibility by using isobutyl methacrylate as a comonomer (EP-A 0 477 708; EP-A 0 539 031).

An important aspect of the plastisol art is dedicated to finding a solution for one of the most urgent problems of plastisol chemistry, namely storage stability. To state it more precisely: an important requirement in plastisol chemistry is plastisol pastes (consisting of solid polymers and plasticizers) that have sufficient storage stability, which is demonstrated by a constant viscosity after an extended period of time, however, all the while maintaining their capacity for film formation after extended heating and subsequent cooling, which are the requirements of the gelling process.

The technical problems associated with these requirements are explained in more detail using the example of PAMA plastisols. The use of spray-dried emulsion polymerizates in combination with the usual plasticizers, as all experience has shown, results in plastisol pastes with good film formation properties but poor storage stability. As described in EP-A 0 477 708, the addition of bead polymerizates increases the storage stability of such plastisol pastes, without clearly having a negative effect on the film formation properties.

In contrast, while mixtures of bead polymerizates with plasticizer do form pastes with sufficiently stable viscosity, it has not been possible to achieve satisfactory film formation with this combination until now. Although the combination of spray-dried PAMA emulsion polymerizates and PAMA bead polymerizates yields technically perfect results, the combination of these starting products, which are obtained according to completely different production methods, presented the industry with the problems of making the plasticizers available and adapting them (as well as any other additives) to the specific properties of the polymer species, which behave heterogeneously relative to the plasticizers. For these reasons, a matrix polymer with a uniform provenance was preferred over the combination of different types of polymers. It is understood that significant reductions with regard to storage stability, viscosity behavior and film formation properties would not be acceptable.

A need therefore continues to exist for a plastisol of improved plasticizer compatibility, storage stability, viscosity behavior and film formation properties.

SUMMARY OF THE INVENTION

Accordingly, one object of the present invention is to provide a plastisol, especially PAMA, which exhibits wide plasticizer compatibility, improved storage stability, improved viscosity behavior and improved film forming properties.

Briefly, this object and other objects of the present invention as hereafter will become more readily apparent can be attained by a bead polymerizate P which is prepared by suspension polymerization of a monomer and then mechanical comminution of the polymer obtained.

Another aspects of the invention is to provide a plastisol which is a mixture of bead polymerizate P with a plasticizer, filler and other plastisol additives.

DETAILED DESCRIPTION OF THE PREFERRED EMBODIMENTS

It has now been found that plastisols, especially the PAMA plastisols of the present invention, fulfill the objectives stated above.

The present invention makes the technology of polymer materials available in a form which is particularly advantageous for use in plastisols, namely in the form of mechanically comminuted bead polymerizates. The present invention is therefore suitable for all those cases in which bead polymerizates of polymers which are simultaneously suitable for the production of plastisols are accessible. In general, the present bead polymerizates have a glass transition temperature $T_g$ of $\geq 35°$ C. preferably $\geq 50°$ C., and especially in the range $\geq 70°$ C.

A preferred aspect of the present invention relates to polymer masses M based on poly(meth) acrylate, which are plasticized using plasticizer additives, and which can be thermally formed into film from a plastisol which consists of, in addition to the usual plasticizers, fillers and additives. The monomer constituency of the polymer P preferably produced by means of bead polymerization, is composed of a-1) 50–100% by weight methyl methacrylate;

a-2) 0–50% by weight of at least one monomer which is not methyl methacrylate, with the formula I

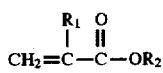

where $R_1$ stands for hydrogen or methyl and $R_2$ stands for an alkyl, possibly branched, with 1 to 14, preferably 1 to 6 carbon atoms; and a-3) 0–20% by weight of another vinyl monomer VM, different from a-1) and a-2), a-4) 0–20% by weight of an adhesion-promoting monomer HM, with the stipulation that the polymer P is comminuted by mechanical comminution onto polymer particles PP.

Normally, most embodiments of polymer P are comprised of components a-1) to a-3). The bead polymerizates, produced by suspension polymerization of the monomers, possess an original bead size in the range of 50 to 100 μm. The mechanically comminuted bead polymer particles PP can be obtained by means of the various technical methods for the comminution of polymer particles (cf. Ullmann's Encyclopedia of Industrial Chemistry, 5th Ed., Vol. A20, p. 668, VCH 1992). The simplest method of comminution is grinding. The particle size of the bead polymer particles PP obtained by means of mechanical comminution is usually in the range of 10 to 30, preferably 10 to 30 μm.

Preferably, the proportion of methyl methacrylate in polymer P is in the range of 60 to 100, preferably 70 to 95% by weight, while the proportion of the various remaining monomers which are different from methyl methacrylate in the polymer ranges from 0 to 40% by weight, preferably 5 to 30% by weight.

In the case of monomer (a-2) of Formula 1 shown above, the alkyl group $R_2$ is preferably an isobutyl or n-butyl group, with n-butyl especially preferred. By definition, $R_1$ and $R_2$ cannot both stand for methyl in Formula I at the same time, but methyl acrylate is certainly possible as a monomer of Formula I.

Radically polymerizable monomers which possess functional groups that can interact with the materials to be coated by the polymer P should be understood to be the adhesion-promoting monomers HM as component (a-4) of the polymer. Such an interaction can come about, for example, by means of hydrogen bond formation, complexation, dipole forces and similar bonding processes. Generally, heteroatoms such as nitrogen or oxygen participate in such bonding.

Suitable functional groups of monomer (a-4) include the amino group, especially dialkylamino, (cyclic)amide, imide, hydroxy, oxy, carboxyl, and cyano. Monomers (a-4) are known as described by H. Rauch Puntigam and Völker, Acryl- und Methacrylverbindungen [Acryl and Methacryl Compounds], Springer-Verlag 1967; Kirk-Othmer, Encyclopedia of Chemical Technology, 3rd Ed., Vol. 1, p. 394–400, J. Wiley 1978; DE-A 25 56 080; DE-A 26 34 003. Preferably, the adhesion-promoting monomers HM belong to the monomer class of vinyl heterocycles containing nitrogen, preferably 5-membered and 6-membered rings and/or the copolymerizable vinyl carboxylic acids and/or the hydroxyalkyl, alkoxyalkyl, and aminoalkyl substituted esters or amides of acrylic or methacrylic acid. Suitable nitrogen-heterocyclic monomers HM include vinyl imidazoles, vinyl lactams, vinyl carbazoles and vinyl pyridines. Examples of imidazole compounds include N-vinyl imidazole (also called vinyl-1-imidazole), N-vinylmethyl-2-imidazole, N-vinyl-ethyl-2-imidazole, N-vinylphenyl-2-imidazole, N-vinyl-dimethyl-2,4-imidazole, N-vinyl-benzimidazole, N-vinyl imidazoline (also called vinyl-1-imidazoline), N-vinyl-methyl-2-imidazoline, N-vinyl-phenyl-2-imidazoline and vinyl-2-imidazole.

Examples of vinyl-lactam monomers include N-vinyl pyrrolidone, N-vinyl methyl-5-pyrrolidone, N-vinyl methyl-3 pyrrolidone, N-vinyl ethyl-5-pyrrolidone, N-vinyl dimethyl-5,5-pyrrolidone, N-vinyl phenyl-5-pyrrolidone, N-alkyl pyrrolidone, N-vinyl thiopyrrolidone, N-vinyl piperidone, N-vinyl diethyl-6,6-piperidone, N-vinyl caprolactam, N-vinyl methyl-7-caprolactam, N-vinyl ethyl-7-caprolactam, N-vinyl dimethyl-7,7-caprolactam, N-allyl caprolactam, N-vinyl capryllactam and the like.

Examples of vinyl carbazoles include N-vinyl carbazole, N-allyl carbazole, N-butenyl carbazole, N-hexenyl carbazole, N-(methyl-1-ethylene) carbazole, and the like.

Examples of copolymerizable vinyl carboxylic acids preferably include acrylic and methacrylic acids, and salts thereof.

Examples of oxy-substituted and alkoxy-substituted alkyl esters of (meth)acrylic acid include 2-hydroxyethyl (meth) acrylate, hydroxypropyl (meth)acrylate, 2-methoxyethyl (meth)acrylate, 2-ethoxyethyl (meth)acrylate, 2-butoxyethyl (meth)acrylate, 2-(2-butoxy ethoxy)ethyl methacrylate, 2-(ethoxyethyloxy)ethyl (meth)acrylate, 4-hydroxybutyl-(meth)acrylate, 2-[2-(2-ethoxyethoxy)ethoxy]ethyl (meth) acrylate, 3-methoxybutyl-1-(meth)acrylate, 2-alkoxymethylethyl (meth)acrylate, 2-hexoxyethyl (meth)acrylate.

Examples of amine-substituted alkyl esters of (meth) acrylate include 2-dimethylaminoethyl (meth)acrylate, 2-diethylaminoethyl (meth)acrylate, 3-dimethylamino-2,2-dimethylpropyl-1-(meth)acrylate, 3-dimethylamino-2,2-dimethyl-propyl-1-(meth)acrylate, 2-morpholinoethlyl (meth)acrylate, 2-tert.-butylaminoethyl (meth)acrylate, 3-(dimethylamino)propyl (meth)acrylate, 2-(dimethylaminoethoxyethyl) (meth) acrylate, and the like.

Examples of (meth)acrylamides include N-methyl (meth) acrylamide, N-dimethylaminoethyl (meth)acrylamide, N-dimethylaminopropyl (meth)acrylamide, N-isopropyl (meth)acrylamide, N-tert.-butyl (meth)acrylamide, N-isobutyl (meth)acrylamide, N-decyl(meth)acrylamide, N-cyclohexyl (meth)acrylamide, N-[3-(dimethylamino)2,2-dimethylpropyl] (meth)acrylamide, N-[2-hydroxyethyl] (meth)acrylamide, and the like.

The production of the bead polymerizates P is carried out in known manner, by means of suspension polymerization (Houben-Weyl, 4th edition, Vol. XIV/1, p. 406–433, Georg Thieme Verlag 1961, and Vol. E20, 1149–1154, Georg Thieme Verlag 1987, cf. DE-C 28 5506; DE 90 7827). In suspension polymerization, the monomers (disperse phase) are distributed in water (continuous phase) while stirring, are distributed using dispersants and/or protective colloids, and polymerized by means of initiators which are soluble in the monomers. It is known that inorganic substances such as (colloidal) aluminum hydroxide, and also natural substances with a high molecular weight or synthetic polymers can be used as dispersants.

The ratio of the aqueous to the monomer phase is usually 2:4 to 4:1 parts by weight. Organic peroxy and/or azo compounds are particularly used as initiators, for example, acyl peroxides such as dibenzoyl peroxide, lauroyl peroxide, tert.-butyl perpivalate, in amounts of 0.1 to 0.7, preferably 0.2–0.5% by weight relative to the monomers.

For the production of the polymerizates P, the molecular weight of the polymer can be regulated by adding regulators, usually sulfur regulators, particularly alkyl mercaptans such as dodecyl mercaptan and lauryl mercaptan, in amounts of approximately 0.05 to 0.5% by weight relative to the monomers. The molecular weight is generally in the range of 20,000 to 1,000,000.

Usually, 20–50% bead suspensions are obtained, from which the polymerizate beads can be separated by means of filtering, decanting or centrifugation. The bead polymerizates PP generally have a particle size of 10–100 μm, preferably 40–60 μm.

As already mentioned, a significantly broader range of plasticizers can be used in the present compositions without restrictions, than in directly comparable plastisol compositions. Primarily, plasticizers having a low polarity can be used such as the alkyl esters of phthalic acid, adipinic acid or sebacinic acid; chlorinated paraffins; trialkyl phosphates; aliphatic or araliphatic polyesters, dibenzoates or esters of citric acid. In addition to plasticizers having a medium polarity, such as higher polyglycols, phthalic acid polyesters, adipinic acid polyesters and many more can be used. A general rule is that all of the plasticizers suitable for PVC can be used. The phthalate plasticizers are particularly preferred, because of their outstanding technical significance.

A detailed description of suitable plasticizers is found in the Kunststoff-Handbuch [Plastics Handbook], editor H. K. Felger, Vol. 1/1C, Hanser Verlag 1985, as well as in H. F. Mark et al., Encyclopedia of Polymer Science and Engineering, Supplemental Volume, p. 568–647, J. Wiley 1989. A selection of suitable plasticizers can also be found in DE-C 25 43 542.

Diisodecyl phthalate, benzyl octyl phthalate and dioctyl phthalate are particularly preferred plasticizers. As noted above, the plasticizers are used in amounts of 5 to 200 parts by weight to 100 parts by weight of the polymers (P) [sic].

Usually, fillers are among the normal components of a plastisol formulation. The amount of filler employed is generally up to 400, preferably 200 parts by weight per 100 parts by weight of the polymer mass or bead polymerizate. By far the most important filler is chalk, along with barite, kaolin, silicon dioxide in various modifications, silicates or sand, talcum, clays such as bentonite, glass powder, aluminum oxide or hydrated forms of it, titanium dioxide, graphite, carbon black, as well as dyes or pigments, and corrosion inhibitors. It is advantageous if the fillers are used in a suitable particle size, for example in the range of 5 to 30 μm. (Determination according to Ullmann's Encyclopadie der techn. Chemie (Encyclopedia of Technical Chemistry), 4th edition, Vol. 5, p. 725–752). The grain size distribution can be determined by measuring the light extinction of a suspension of the particles in water flowing through the measurement cell of a measurement device ("Kratel Partoskop F" from Kratel GmbH, Göttingen). The fillers can be precipitated, for example, and/or ground, and can be coated, if necessary.

Furthermore, the plastisols can contain the usual additives such as, for example, viscosity regulators including emulsifiers and silicones, and stabilizers for heat, light and oxidation. The production of foamed plastigels by adding propellants such as azo compounds is also possible.

The bead polymerizates are produced in a 100-1-V4A vat with an impeller stirrer and a bulwark. Heating takes place by means of a heating mantle with water circulation. The apparatus is equipped with a temperature sensor, reflux cooler and a device for flushing with inert gas. The stirring speed can be varied by means of gears.

Polymerization is carried out as follows:

To produce the dispersant (suspension stabilizer), aluminum sulfate is dissolved in the total amount of deionized water presented, while stirring, and an inert gas ($N_2$ or $CO_2$), is passed through the reactor. The contents are heated to a polymerization temperature of 65° to 80° C. The dispersant is precipitated as aluminum hydroxide by adding aqueous soda solution to the reactor until a pH of 5.5 is reached. To improve the dispersant effect, 5% by weight, calculated as $Al(OH)_3$, of a $C_{14}$ to $C_{16}$ alkylsulfonate is added in the form of the sodium salt. The monomer phase, which contains the initiator and any molecular weight regulators and other additives, such as plasticizers, etc., in the dissolved form, if necessary, is introduced into the suspension and is dispersed in the form of small droplets by means of the shear effect of the stirrer. The stirrer speed can be varied within wide limits.

A prerequisite is that the vertical circulation of the vat contents by the stirrer system, in addition to the dispersion of the monomers into droplets of the desired size, must be sufficiently strong that rising or sinking of the monomer droplets resulting from density differences between the water phase and the monomer phase is prevented. If the ratio between the water phase and the monomer phase used here, is 3:1, the following batch size results: 45 kg water, 15 kg monomer.

During polymerization, the temperature of the circulatory heating system is maintained constant. The interior temperature is therefore 10° to 20° C. above the initial temperature within 30 to 120 minutes. The temperature reached is kept constant for about 2 hours by regulating the heating system, then the batch is cooled to about 25° C., and most of the water is removed after dissolution of the distributor, by adding sulfuric acid. This is done on a suction filter or a decanter.

The soluble polymerization aids are removed by re-washing with deionized water. The proportion of the water remaining in the bead polymerizate can be varied by varying the suction or centrifugation conditions. The proportion of water is determined by gravimetry.

The mean particle size of the polymerizate beads is determined under a microscope. The $\eta_{sp/c}$ value (Makromolekulare Chemie [Macromolecular Chemistry] 7, p. 294, 1952) measured at 20° C. in chloroform or in nitromethane is suitable for characterizing the molecule size. The $\eta_{sp/c}$ values are generally in the range of 120–400 mL/g.

COMMINUTION OF THE BEAD POLYMERIZATE

The polymerizate, consisting, for example, of pure methyl methacrylate, or in the form of a copolymerizate, is ground in a suitable grinding device, for example an impact disk mill. For example, beads with an average starting grain size of approximately 45 μm are ground to obtain a particle size of approximately 11 μm.

Advantageous Effects

The plastisols of the invention are suitable for all the applications which have been indicated as areas of application for PVC and PAMA plastisols. For example, the present plastisol is particularly useful for coating sheet metal, especially cataphoresis sheet metal, especially anti-corrosive and stone-protecting coating materials for cars. The plastisol can be used as a contact layer for floor coverings, by application onto a suitable carrier. Furthermore, free transparent films which can be produced from these plastisols are of technical interest. In addition, the use of the plastisol for wall coverings, plastic tarps (truck tarps), interior roof linings for automobiles, dashboard facings, and many more such uses can be mentioned. In comparison to relevant polymer masses known in the art, the plastisols are characterized by improved mechanical properties, such as better elastic memory. The improved plasticizer retention behavior is also particularly important.

Having generally described this invention, a further understanding can be obtained by reference to certain specific examples which are provided herein for purposes of illustration only and are not intended to be limiting unless otherwise specified.

I. Production of the comminuted bead polymerizates PP

A bead polymerizate P was prepared from pure methyl methacrylate, with an $\eta_{sp/c}$ value of ~200, and was ground in an impact disk mill:

Starting grain size: ~45 μm
Grain size after grinding: ~11 μm

Plastisols were produced from the polymer powder PP produced in this way, in comparison with a non-ground bead polymerizate P and a polymerizate prepared by emulsion polymerization and subsequent spray-drying. These plastisols were then investigated with regard to their properties upon use.

II. Production of the Plastisols

The polymers were mixed with benzyloctyl phthalate as the plasticizer, dispersed on a three-roller frame and subsequently degassed in a vacuum mixer. The plastisol masses were applied to "teflonized" metal sheets using a doctor blade, and gelled in an electric oven for 10 min at 180° C. The optical appearance of the liquid plastisols, the appearance of the gelled films and the plasticizer migration out of the films were evaluated. Furthermore, the films were tested for tensile strength and expansion to rupture.

III. Results

As shown in the table infra, while the non-homogeneous masses, in which the beads settle to the bottom after storage, are formed when using the normal, non-ground bead polymerizates P, as was to be expected, the mixtures produced from ground bead polymerizate PP (or from the spray-dried emulsion polymerizate) and plasticizer are still homogeneous even after an extended period of storage. After the plastisols had been applied to a surface and then gelled, the plastisols based on the ground bead polymerizates and on the spray-dried emulsion polymerizates produced cohesive films with a smooth surface, while this is not the case when using mixtures of bead polymerizates and plasticizers. Since the polymer in these mixtures is not sufficiently expanded during the gelling process, a sticky, liquid plasticizer layer with powder loosely embedded in it, i.e. not a cohesive coating, is obtained. With regard to plasticizer migration, elongation to rupture and tensile strength, the values obtained with the ground powders are practically the same as those for spray-dried emulsion polymerizates.

TABLE

| Polymerizate (POL) | Plasticizer (W) | Mixture ratio POL/W | Viscosity | Homogeneity | Breaking strength | Elongation to rupture | Plasticizer migration |
|---|---|---|---|---|---|---|---|
| Polymerizate P | Benzyloctyl phthalate | 40/60 | — | non-homogeneous | — | — | — |
| Polymerizate PP | " | 40/60 | 0.80 Pas | homogeneous | 1.08 MPa | 548% | very slight |
| ground | " | 50/50 | 1.69 Pas | homogeneous | 3.01 MPa | 325% | none |
| Emulsion polymerizate | " | 40/60 | 1.43 Pas | homogeneous | 0.68 MPa | 670% | medium |
| spray-dried | " | 50/50 | 300 Pas | homogeneous | 3.70 MPa | 395% | very slight |

Having now fully described the invention, it will be apparent to one of ordinary skill in the art that many changes and modifications can be made thereto without departing from the spirit or scope of the invention as set forth herein.

What is claimed as new and is desired to be secured by Letters Patent of the United States is:

1. A method of preparing a bead polymerizate P, comprising:
   suspension polymerizing a dispersion of monomers having a constituency comprising:
   a-1) 50–100% by weight methyl methacrylate;
   a-2) 0–50% by weight of at least one monomer, which is not methyl methacrylate, with the formula 1

where
   $R_1$ stands for hydrogen or methyl and
   $R_2$ stands for $C_{1-14}$ alkyl branched or unbranched;
   a-3) 0–20% by weight of another vinyl monomer VM, which excludes (a-1) and (a-2), and
   a-4) 0–20% by weight of an adhesion-promoting monomer HM, in the presence of a dispersant or protective colloid in water containing a water soluble initiator;
   separating the bead polymerizate P from the aqueous polymerization medium; and
   comminuting the separated bead polymerizate.

2. The method of claim 1, wherein the ratio of the aqueous phase to the monomers is 2:4 to 4:1 parts by weight.

3. The method of claim 1, wherein said initiator is a peroxide in an amount of 0.1 to 0.7 parts by weight with respect to the monomers.

* * * * *